Sept. 13, 1960

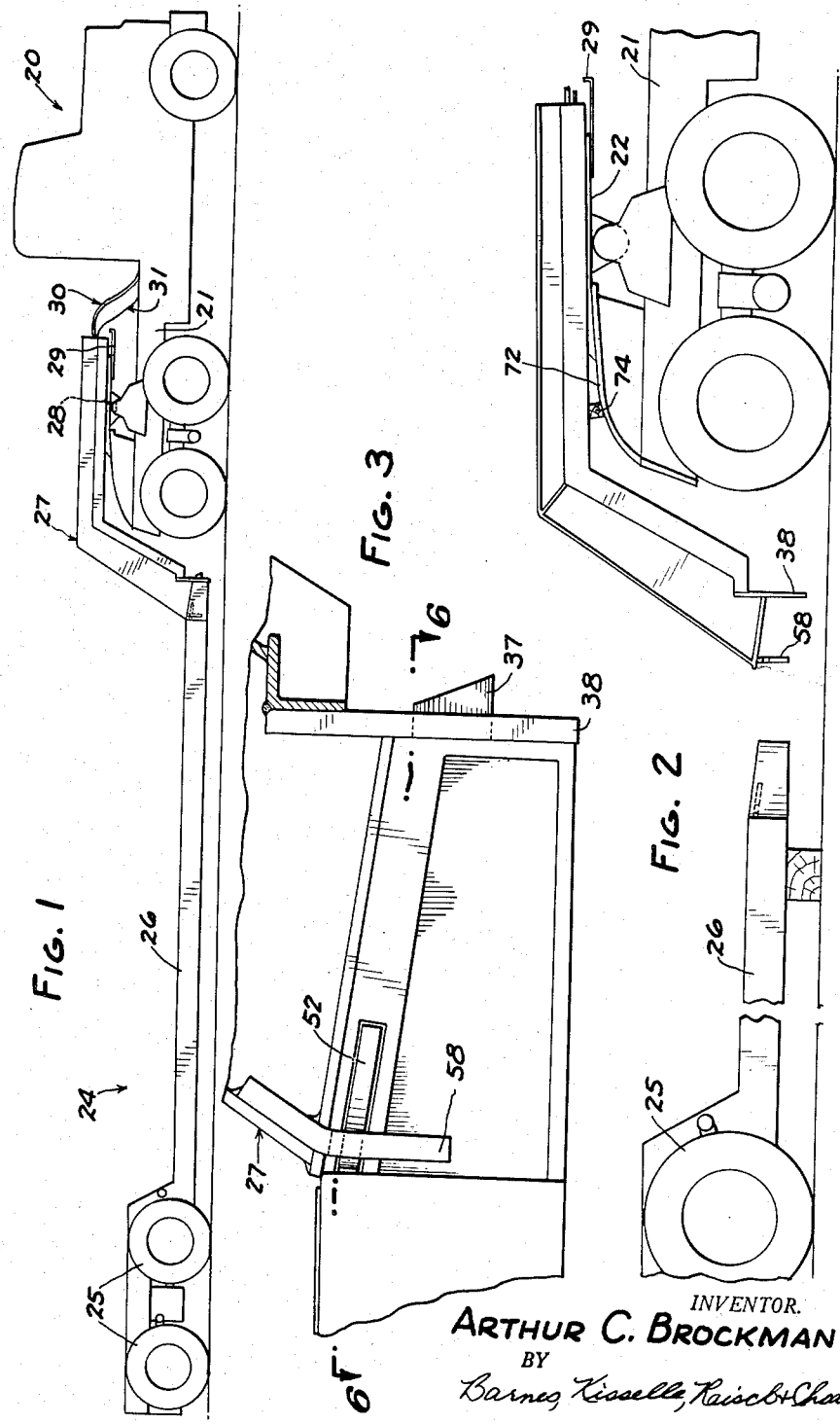

A. C. BROCKMAN 2,952,476

SEMI-TRAILER CONSTRUCTION

Filed Aug. 29, 1958

INVENTOR.
ARTHUR C. BROCKMAN
BY
Barnes, Kisselle, Raisch & Choate
ATTORNEYS

Sept. 13, 1960 A. C. BROCKMAN 2,952,476
SEMI-TRAILER CONSTRUCTION
Filed Aug. 29, 1958 5 Sheets-Sheet 4

INVENTOR.
ARTHUR C. BROCKMAN
BY
ATTORNEYS

United States Patent Office 2,952,476
Patented Sept. 13, 1960

2,952,476
SEMI-TRAILER CONSTRUCTION
Arthur C. Brockman, 10101 Ford Road, Birmingham, Mich.
Filed Aug. 29, 1958, Ser. No. 757,960
10 Claims. (Cl. 280—423)

This invention relates to a tractor and semi-trailer combination and is particularly concerned with a semi-trailer of the type having a low bed and having a gooseneck for transmitting load from the trailer bed to the fifth wheel of a tractor, the gooseneck being detachable from the trailer bed to facilitate front end loading and unloading of the trailer. Semi-trailer combinations of this type are frequently used for hauling unusually heavy loads such as heavy industrial machinery, earth moving machinery, and the like.

The gooseneck is necessarily of strong heavy construction and attaching and detaching the gooseneck from the trailer bed presents handling problems. A conventional way of meeting this problem is to mount a winch on the tractor forwardly of the fifth wheel member. The gooseneck is raised, lowered and supported during its manipulation by means of a cable wound on the winch. Because of the relatively great weight of the gooseneck and the distance which it projects beyond the supporting part of the tractor, the winch equipment and its power take-off from the tractor transmission must be relatively large, strong and expensive. The cost of mounting a suitable winch on a tractor and adding a power take-off is of the order of about $1,000.00. The addition of a winch to the tractor makes it a special purpose vehicle and reduces its overall usefulness.

Another disadvantage of the winch and cable handling mechanism for a gooseneck is that the steps involved in removing the gooseneck from its trailer bed and reconnecting the gooseneck to the trailer are complex and time consuming. Moreover, if through inexperience or carelessness, the operator fails to follow the proper sequence of steps, cable breakage and damage to the winch mechanism frequently occur. Failure to follow and properly execute the sequence of steps also frequently results in dropping the gooseneck on the ground which necessarily involves a waste of time and effort in either jacking the gooseneck up or in calling in a crane of adequate capacity to lift the gooseneck for further handling.

Numerous attempts have been made heretofore to provide structures eliminating the necessity for the winch and utilizing solely the mobility and power of the tractor itself for handling the gooseneck. Two successful structures for accomplishing this are disclosed in my co-pending applications, Serial No. 709,772, filed August 21, 1957, and Serial No. 592,883, filed June 21, 1956, which has ripened into Patent Number 2,871,027 dated January 27, 1959.

An object of the present invention is to provide a further simplified improved inexpensive semi-trailer structure facilitating more rapid simple fool proof manipulation of a gooseneck to and from connected relation to a low bed trailer.

The invention is carried out generally by providing fixed stirrups on the gooseneck with longitudinally slidable bars mounted in forward projections on the trailer bed for engagement with the stirrups to provide the load-transmitting connection between the gooseneck and bed. Movable latch elements are mounted on the trailer bed and are engageable with fixed latch elements on the gooseneck to restrain relative movement of the gooseneck and trailer bed. Fluid pressure motors are connected to the load-bearing bars through certain linkage, and springs are interposed between this linkage and the movable latch elements in such a way that when pressure is introduced into the motors the load-bearing bars and latches may be disconnected by forward and rearward movements of a tractor. The stirrups and locking bars and the latching elements are so arranged that even though they may not initially interlock when the gooseneck is backed toward the trailer bed for coupling because of vertical disalignment of the gooseneck and bed, they will automatically interlock when the gooseneck is lowered so that its base seats on the forward projections of the trailer bed.

One form of the invention is illustrated in the accompanying drawings.

Fig. 1 is a partly diagrammatic side elevation of a tractor and semi-trailer combination utilizing the present invention.

Fig. 2 is an enlarged fragmentary partly diagrammatic elevational view illustrating the trailer bed and gooseneck in uncoupled relation.

Fig. 3 is an enlarged fragmentary elevational view illustrating structure at the forward end of a frame projection on the trailer bed.

Figure 4:
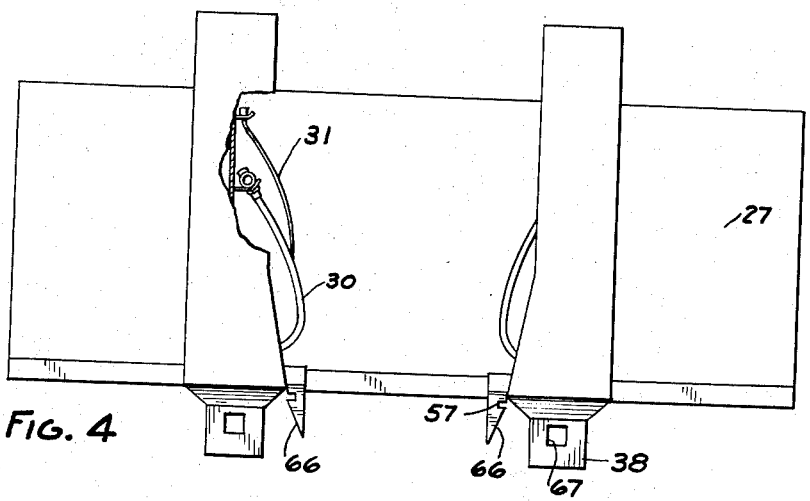
Fig. 4 is a rear elevational view of the gooseneck.
Figure 5:
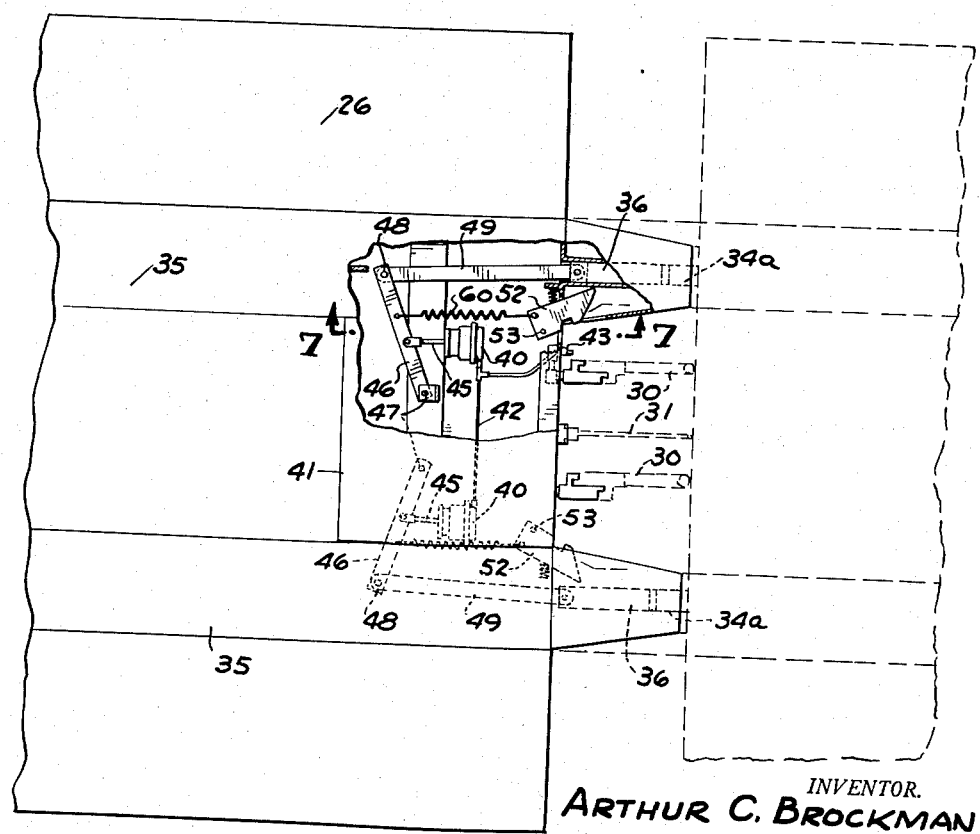
Fig. 5 is a top plan view of the trailer bed with parts broken away and parts illustrated in phantom to illustrate structure.

Shown in the drawings is a tractor 20 having a frame 21 on which is mounted a conventional fifth wheel element 22. A low bed type semi-trailer 24 having rear ground engaging wheels 25 and a bed 26 is coupled with tractor 20 through a gooseneck 27 having adjacent its forward end portion a conventional fifth wheel plate with a depending king-pin 28 releasably engaged with latching mechanism (not shown) on fifth wheel element 22. The fifth wheel latch is provided with a release lever 29. Tractor 20 has air lines 30 for furnishing air under pressure to the air brake system of semi-trailer 24 and has electric conduits 31 for furnishing current to the semi-trailer.

Trailer bed 26 has a pair of lugs 34 which project forwardly of the front line of the trailer bed and these lugs may comprise extensions of the trailer bed frame members 35. Lugs 34 have internal ways 34a and a bar slidably mounted within the ways of each lug so that it can be moved to a forward position in which its front end portion 37 projects out of an opening 39 in the front end of lug 34 and so that it can be retracted into lug 34. Bars 36 co-operate with stirrups 38 on gooseneck 27 to provide a load transmitting connection between the gooseneck and trailer bed. A pair of fluid pressure motors 40 which are preferably pneumatic motors, are mounted on the trailer bed adjacent its forward end and preferably beneath a floor plate 41. These motors are furnished compressed air by air lines 42 containing a valve 43. Air lines 42 are preferably connected into the air pressure reservoir tanks (not shown) on the trailer which provide air to the brakes for trailer wheels 25. Each motor has a piston rod 45 operably connected to a lever 46 pivoted at one end 47 to the trailer bed and having its other end 48 pivotally connected to a link 49 secured to one of bars 36. With this arrangement motors 40 may be operated to retract bars 36 from engagement from gooseneck stirrups 38.

A pair of latching elements 52 are secured to the trailer bed by pivots 53 and each latch element has a taper portion 54 which swings through an opening 55 in the inner face of a lug 34. Adjacent each taper portion 54 is a notch 56 engageable with a complementary notch 57 in a latching element 58 fixed to the rear end of gooseneck 27. A spring 60 is connected at one end to each latch element 52 and at its other end to a lever 46 so that when bars 36 are in their retracted position spring 60 is stressed to urge latching elements 52 toward open position for disengaging latch elements 58. Springs 61 are also provided for urging latch elements 52 toward closed position when stress in springs 60 is relieved.

Gooseneck 27 has a pair of rear-ward projections 64 whose undersides 65 provide base portions for seating on the tops 70 of lugs 34. Latch elements 58 are fixed in positions adjacent the rear-ward ends of base portions 65 and project below base portions 65 as shown. The outwardly facing edges of latches 66 of latch elements 58 are tapered below locking notches 57 for a purpose to be described. Stirrups 38 are formed by fixed plates depending below base portions 65 and each stirrup has an opening 67 for receiving forward end portion 37 of bar 36.

Figure 6:
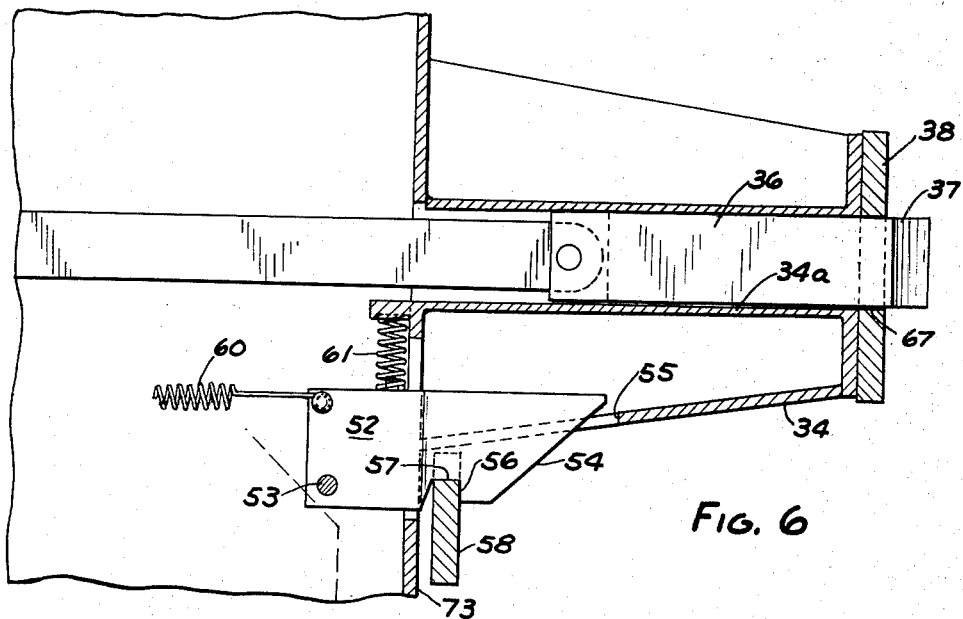
Fig. 6 is a sectional view taken generally on line 6—6 of Fig. 3.
Figure 7:
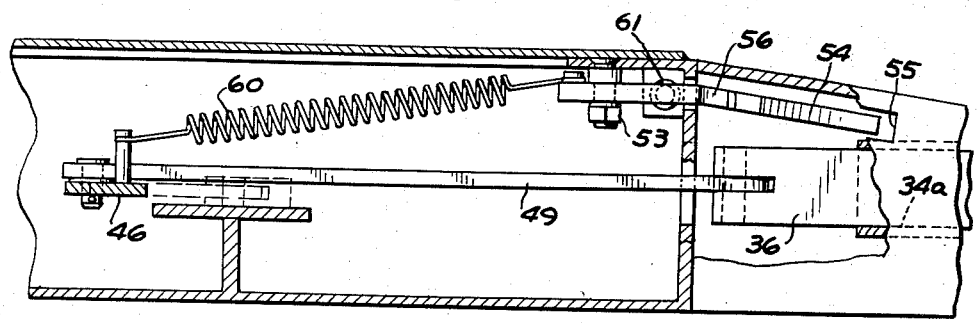
Fig. 7 is an enlarged sectional view on line 7—7 of Fig. 5.

In use it may be assumed that initially gooseneck 27 is coupled to tractor 20 as generally illustrated in Figure 1. In this relation of the parts gooseneck base portions 65 rest upon the tops 70 of lugs 34. Stirrup plates 38 are engaged against the forward ends of the lugs 34, bars 36 are positioned so that their forward portions 37 project through openings 67 in the stirrups (Figures 3 and 6), and latching elements 52 are swung toward each other so that their notched portions 56 projecting through opening 55 are interlocked with notched portions 57 of latch elements 58.

Figure 11:
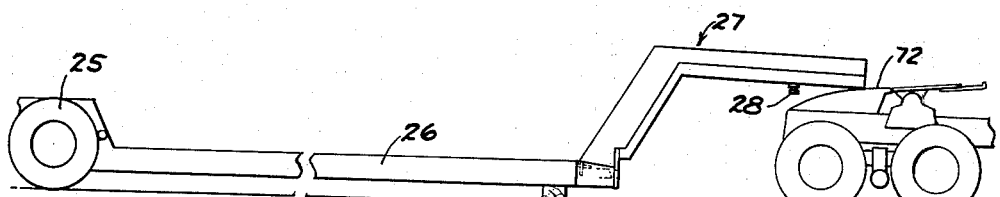
Figs. 11–15 are partly diagrammatic elevational views illustrating a number of steps in the coupling and uncoupling of the trailer bed and gooseneck.

To uncouple gooseneck 27 from the trailer bed, the operator sets the brakes for wheels 25, uncouples the air hose and electric cord connections between the trailer and tractor, and opens valve 43 to introduce air under pressure into pneumatic motors 40 which through linkage 45—49 urge bars 36 in a rear-ward direction. Bars 36 do not actually retract from stirrups 38 at this time because the frictional force between the interengaging surfaces of bars 36 and stirrup openings 67 incident to the load of the trailer bed is sufficient to resist the force exerted by motors 40. The operator releases the fifth wheel latch on the tractor by manipulating lever 29 and may place a block 71 under the forward end of the trailer bed. The operator then drives the tractor forwardly. Gooseneck 27 is held against movement with the tractor by interlocked notches 56 and 57 on latching elements 52 and 58. As the tractor moves forwardly the front end portion of the gooseneck rides down ramp elements 72 on the tractor so that the front end of the gooseneck lowers (Fig. 11). This relieves the load transmitted between the trailer bed and gooseneck through bars 36 and stirrups 38 and relieves the frictional force therebetween.

When this frictional force is relieved, motors 40 retract the bars out of engagement with stirrups 38. The gooseneck continues to support the front end of the trailer bed through interengagement of notches 56 and 57 on latching elements 52 and 58. When bars 36 are retracted springs 60 are stretched and stressed so that they tend to swing the latch elements 52 away from each other toward positions out of engagement with fixed latch elements 58. The force of springs 60 is insufficient to overcome frictional engagement of the latch members when they transmit load between the bed and gooseneck.

Figure 12:
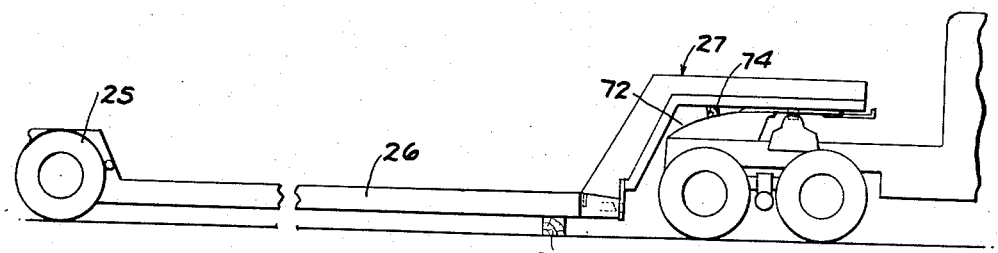
Figure 13:
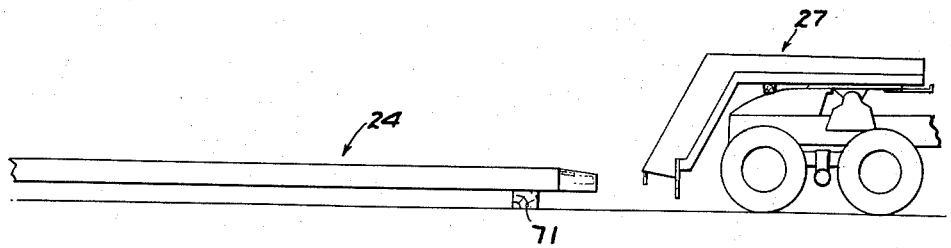

The operator then backs the tractor so that the forward end of the gooseneck rides up ramps 72 and the fifth wheel elements couple. At this point the operator may place a block 74 beneath the gooseneck and on ramps 72 (Fig. 12). In this position, load on the interengaged latch elements 52 and 58 and the resulting friction therebetween is relieved and springs 60 swing latches 52 out of engagement with latch elements 58. The tractor may then be driven forward and gooseneck 27 moves forwardly with it away from trailer bed 24 (Fig. 13).

In the Fig. 11 uncoupling step, if the operator should inadvertently drive the tractor too far forward so that it is completely removed from under the gooseneck, the gooseneck will be retained in its erect position on the trailer bed by interengagement of latch notches 56 and 57. The subsequent uncoupling steps may be accomplished in the manner described.

Figure 14:
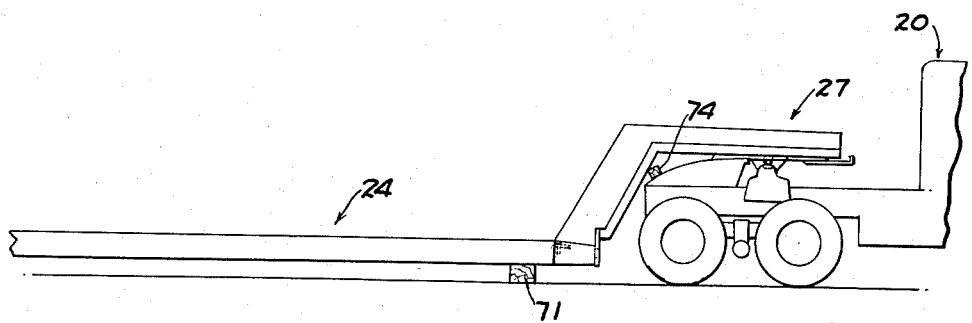

To recouple the gooseneck with the trailer bed, valve 43 is operated to exhaust the air pressure in motors 40 and springs 60 return bars 36 forwardly so that their forward end portions 37 project out of lugs 34 for engagement with stirrups 38. This relieves the stress in springs 60 and springs 61 swing latch members 52 inwardly to positions for engagement with latch members 58 on the gooseneck. Tractor 20 is then backed until stirrup plates 38 engage the forward ends of lugs 34 and latch elements 58 engage latch elements 52. If this is done on level ground, forward bar portions 37 will enter stirrup openings 67 and latch elements 58 will engage taper portions 54 of latches 52 and cam them outwardly against the action of springs 61 until the notches in the latch elements register at which time springs 61 will force latch elements 52 inwardly to interlock the latches. The rear end of the gooseneck will be elevated somewhat by interengagement of the slightly tapered base portions 65 and lug portions 70 and block 74 will fall out of its position or may be removed. This position of the parts is illustrated in Fig. 14. Air lines 30 and electric cables 31 may then be recoupled and the tractor trailer combination is ready to operate.

Figure 8:
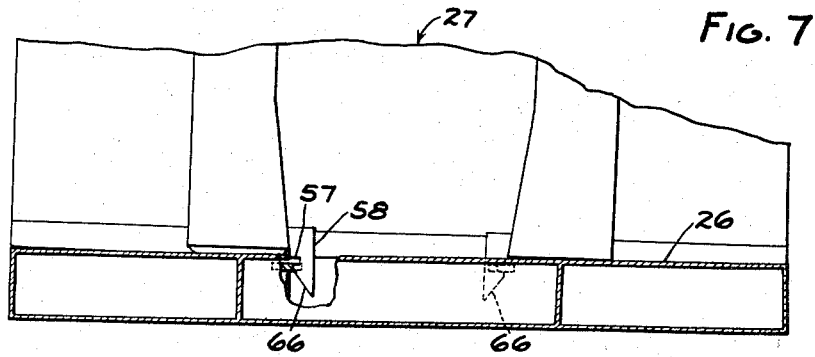
Fig. 8 illustrates an intermediate step in coupling the gooseneck and trailer bed and shows the rear end of the gooseneck in elevation with the trailer bed being shown in section.
Figure 9:
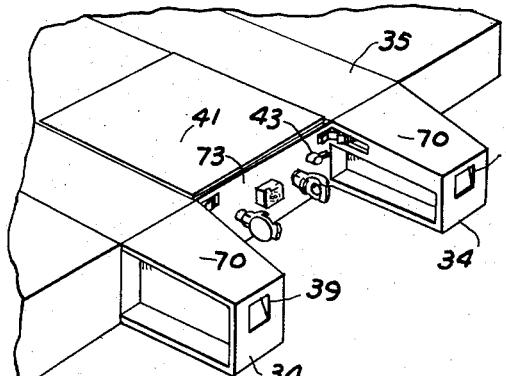
Fig. 9 is a perspective view of the forward end of the trailer bed.
Figure 10:
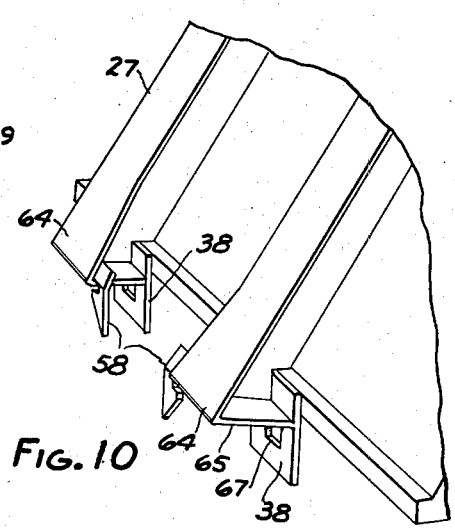
Fig. 10 is a perspective view of the rear end of the gooseneck.

In the event that the recoupling is done on uneven ground, stirrup openings 67 may be disaligned from bars 36 and the notches in the latch elements may be disaligned when the tractor is backed toward coupling position. In this event stirrup plates 38 force the forward ends 37 of the bars back into lugs 34 against the action of springs 60. Also taper portions 66 of latch elements 58 on the gooseneck engage taper portions 54 of the movable latch elements on the trailer bed. Latch elements 58 cam elements 52 outwardly as previously described, but when they reach notches 56 and latch elements 52 are swung inwardly by springs 61, notches 56 engage portions of the latch elements 58 below notches 57. See Fig. 8.

The tractor fifth wheel may now be unlatched and the tractor driven forwardly. Forward movement of the gooseneck will be prevented by interengagement of the latch elements and as the forward end of the gooseneck rides down ramps 72 the base portion thereof will lower so that it seats on lug portions 70. Stirrup openings 67 come into registry with bars 36 which are moved forwardly by springs 60 so that their ends 37 enter the stirrup openings to establish the load transmitting connection. At the same time taper portions 66 of latch elements 58 cam latch elements 52 outwardly until the locking notches register and springs 61 to snap the latching elements into interlocked relation.

Figure 15:
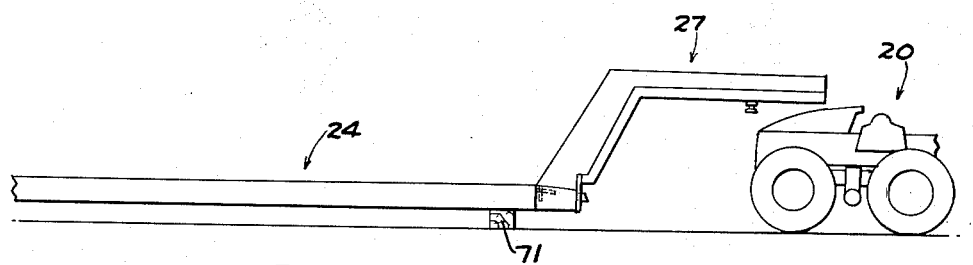

To uncouple the tractor from the gooseneck and leave the gooseneck coupled to the trailer bed the fifth wheel latch is released, the air lines and electric cords are disconnected, and the tractor is driven forwardly (Fig. 15). In this relation of the parts interengaged latching elements 52 and 58 retain the gooseneck in erect position on the trailer bed. To recouple the tractor and gooseneck, the tractor is backed beneath the gooseneck and the fifth wheel, air lines and electric cords are coupled in the usual manner.

I claim:

1. In a semi-trailer having a bed member and detachable gooseneck member for transmitting load to a tractor, the bed member having a seat portion and the gooseneck member having a base portion which seats thereon in coupled relation of said members, the improvement which comprises, means forming a detachable load transmitting connection between said members, motor means operable to urge said connection toward disengagement with insufficient force to overcome the friction in said connection incident to trailer bed load thereon but with sufficient force to disengage said connection when said load is relieved, means forming a second connection securing said members against substantial relative movement when said load bearing connection is disengaged, means operable by said motor means responsively to disengagement of said load bearing connection to urge said second connection toward disconnected relation with a force inadquate to overcome frictional resistance therein incident to securing said members against relative movement but with sufficient force to disconnect said second connection when the latter said load is relieved, whereby to facilitate uncoupling said members.

2. In a semi-trailer having a bed and a detachable gooseneck for transmitting load to a tractor, the bed having a seat portion and a gooseneck having a base portion which seats thereon in coupled relation of said bed and gooseneck, the improvement which comprises, fixed stirrup means on said gooseneck and movable means on said bed co-operating with said stirrup means to provide a load transmitting connection when said bed and gooseneck are coupled, motor means operable to urge said movable means out of engagement with said stirrup means with a force insufficient to overcome the friction in said load bearing connection incident to trailer bed load on said gooseneck but with sufficient force to disengage said movable means from said stirrup means when the trailer bed load is relieved, fixed latch members on said gooseneck and movable latch members on said bed which interengage in coupled relation of said bed and gooseneck to form a second connection therebetween restraining relative movement of said bed and gooseneck when said load bearing connection is disengaged, means operable by said motor means responsively to disengagement of said load bearing connection to urge said movable latch members toward disengagement from said fixed latch members with a force insufficient to overcome the friction between said latch members inicident to the load of restraining relative movement between said bed and gooseneck but with sufficient force to disengage said latch elements when said restraining load is relieved, whereby to release said gooseneck from said bed and facilitate uncoupling thereof.

3. In a semi-trailer having a bed and with a detachable gooseneck for transmitting load to a tractor, the bed having a pair of longitudinal forward projections forming seats and the gooseneck having base portions which rest upon said seats in coupled relation of said bed and gooseneck, the improvement which comprises, means forming ways on said projections, a pair of load bearing bars movable longitudinally of said bed on said ways, a pair of fixed stirrups on said gooseneck with which said bars are engaged to provide a load transmitting connection when said gooseneck base portions are engaged with said seats on said bed, motor means operable to exert force on said bars for urging them in a longitudinal direction for disengagement from said stirrups, said force being insufficient to overcome the friction between said bars and stirrups incident to trailer bed load thereon but being sufficient to retract said bars when said load is relieved, means forming a second disengageable connection between said bed and gooseneck, said second connection restraining relative movement of said bed and gooseneck when said load bearing connection is disengaged, means operable by said motor means responsively to retraction of said bars to exert force on said second connection for disengaging the same, said force being insufficient to overcome to frictional resistance of said second connection incident to the load thereon of restraining relative movement of said bed and gooseneck, said force being sufficient to disengage said second connection when the latter said load is relieved, whereby to release said gooseneck from said bed and facilitate uncoupling thereof.

4. In a semi-trailer having a bed member with a detachable gooseneck member for transmitting load to a tractor, the bed member having a seat portion and the gooseneck member having a base portion which seats thereon in coupled relation of said members, the improvement which comprises, fixed stirrup means on said gooseneck member and movable means on said bed member engaged with said stirrup means in coupled relation of said members to provide a load transmitting connection, fixed latch means on said gooseneck member and movable latch means on said bed member, said latch means having parts which interengage in coupled relation of said members to provide a second connection, motor means operable to exert force on said movable means to urge the same in a direction longitudinal of said bed member toward disengagement from said stirrup means, said force being insufficient to overcome frictional resistance of said load transmitting connection incident to bed member load on said gooseneck member, said force being sufficient to retract said movable means longitudinally out of engagement from said stirrup means upon release of said bed member load, said second connection securing said members against substantial relative movement upon disengagement of said load bearing connection, means operable by said motor means responsively to retraction of said movable means to exert force on said movable latch means in a generally horizontal direction transverse to said longitudinal direction for disengaging said second connection, the latter said force being insufficient to overcome the friction between said latch means incident to the load thereon of securing said members against relative movement, said force being sufficient to move said movable latch means for disengaging said second connection upon release of the latter said loading, whereby to release said gooseneck member from said bed member and facilitate uncoupling thereof.

5. In a semi-trailer having a bed member and detachable gooseneck member for transmitting load to a tractor, the bed member having a seat portion and the gooseneck member having a base portion which seats thereon in coupled relation of said members, the improvement which comprises, means forming a detachable load transmitting connection between said members, fixed latch elements on said gooseneck member and movable latch elements on said bed member having interengaged notched portions providing a second connection, said second connection securing said members against substantial relative movement, motor means operable to disengage said load transmitting connection when the load of said bed member on said gooseneck member is relieved, and means operable by said motor means responsively to disconnection of said load transmitting connection to move said movable latch elements and disengage the notched portions thereof from the notched portions of said fixed latch elements when friction in said second connection incident to securing said members against relative movement is relieved, whereby to release said gooseneck member for movement relative to said bed member and facilitate uncoupling of said members.

6. In a semi-trailer having a bed with a detachable gooseneck for transmitting load to a tractor, the bed having a pair of longitudinally forward projections and the gooseneck having base portions which seat upon the projections in coupled relation of the bed and gooseneck, the improvement which comprises, means forming longitudinal ways on said projections, a pair of bars longitudinally movable in said ways, spring means on said bed urging said bars longitudinally forward so that end portions thereof project forwardly of said projections, a pair of generally vertical stirrup plates fixed on said gooseneck with openings therein positioned for receiving said bars when said base portions seat on said projections, said stirrup plates having portions engageable with said end portions of said bars when said openings in said stirrup plates are disaligned from said end portions so that when said gooseneck is moved toward said bed for coupling with said base portions and seats disaligned said portions of said stirrups force said bars inwardly in said ways against the action of said spring means, said spring means being operable when said base portions are seated on said projections to project said bars into engagement with said stirrup openings for establishing a load transmitting connection between said bed and gooseneck, latch means on said bed and gooseneck interengaged to form a second connection between said bed and gooseneck when said base portions are seated on said projections, motor means on said bed operable to retract said bars from engagement with said stirrup openings when the load of the bed on said gooseneck is relieved whereby to disengage said load transmitting connection, said second connection securing said bed and gooseneck against substantial relative movement when said load transmitting connection is disengaged, and means operable by said motor means to disengage said latch elements when frictional resistance in said second connection incident to securing said gooseneck and bed member against relative movement is relieved, whereby to release said gooseneck for uncoupling from said bed.

7. In a semi-trailer having a bed with a detachable gooseneck for transmitting load to a tractor, the bed having a seat portion and the gooseneck having a base portion which seats thereon in coupled relation of said gooseneck and bed, the improvement which comprises, means forming a detachable load transmitting connection between said bed and gooseneck, a pair of generally horizontally movable latch elements on said bed having taper portions and notch portions, spring means urging said latch elements toward a locking position, a pair of generally vertically extending latch elements fixed on said gooseneck and having notch portions with taper portions extending downwardly thereof, said taper portions of said fixed latch elements being positioned for engagement with said taper portions of said movable elements for camming the latter toward open position against the action of said spring means when said gooseneck is moved toward said bed with said base portion of said gooseneck spaced above said seat portion of said bed, said spring means moving said movable latch elements to engage said notch portions thereof with said taper portions of said fixed latch elements when the same are brought into registry, said taper portions of said fixed latch elements moving downwardly and camming said movable elements further toward open position thereof to facilitate registry and interengagement of said notch portions of said fixed and movable latch elements when said base portion is lowered into engagement with said seat portion, said interengaged latch elements forming a second connection securing said bed and gooseneck against substantial relative movement when said load transmitting connection is disengaged, said second connection being disconnectable upon movement of said movable latch elements toward open relation for releasing said gooseneck to facilitate uncoupling of said bed and gooseneck.

8. In a semi-trailer having a bed with a detachable gooseneck for transmitting load to a tractor, the bed having a pair of forwardly projecting lugs defining seats and the gooseneck having a pair of base portions which engage said seats in coupled relation of said gooseneck and bed, the improvement which comprises, means forming ways on each of said lugs, a pair of bars mounted for longitudinal movement in said ways, spring means urging said bars longitudinally forwardly so that their end portions project forwardly of said lugs, a pair of latch elements mounted for generally horizontal lateral movement on said trailer, springs urging said movable latch elements toward closed relation, a pair of stirrup plates on said gooseneck with openings therein, a pair of fixed latch elements on said gooseneck, said movable latch elements and fixed latch elements having interengageable taper portions and interengageable notch portions, said stirrup plates being engageable against the ends of said bars for forcing said bars into said lugs against the action of said spring means when said gooseneck is moved toward said trailer for coupling with said base portions vertically disaligned from said seats, said taper portions of said latch elements being interengageable during said coupling movement so that said fixed latch portions cam said movable latch portions toward open relation, said notched portions of said movable elements engaging said taper portions of said fixed elements under the action of said springs when said stirrup plates engage against the ends of said lugs, said stirrup openings registering with said bars so that said spring means project the forward ends thereof into said stirrup openings to establish a load transmitting connection when said base portion of said gooseneck is lowered to engage said seats, said taper portions of said fixed latch elements camming said movable elements further toward open relation upon said lowering of said gooseneck so that said notches interengage under the action of said springs, to form a second connection, motor means operable to retract said bars from said stirrups when frictional resistance in said load transmitting connection is relieved, said second connection securing said gooseneck against substantial movement relative to said bed when said load transmitting connection is disengaged, and means operable by said motor means to move said movable latch elements against the action of said springs to disengage the notches in said latch elements when friction therebetween incident to the force of securing said members against relative movement is relieved, whereby to release said gooseneck member and facilitate uncoupling the same from said bed.

9. In a semi-trailer having a bed member and a detachable gooseneck member for transmitting load to a tractor, the bed member having a seat portion and the gooseneck member having a base portion which seats thereon in coupled relation of said members, the improvement which comprises, means forming a detachable load transmitting connection between said members which includes movable elements on said bed member, means forming a second connection between said members which secures said members against substantial relative movement when said load transmitting connection is disengaged, the latter said means including movable latch elements on said bed member, and actuating means for actuating said movable members and latch elements, said actuating means including pneumatic motor means operably connected to said movable elements through linkage, said motor means being operable to urge said movable elements toward a retracted position for disengaging said load transmitting connection, a spring connected between each of said latch elements and said linkage, said spring being stressed responsively to movement of said linkage in retraction of said movable elements, said springs in stressed condition urging said latch elements toward open condition for disconnecting said second connection and facilitating uncoupling of said members, said springs being operable upon inactivation of said motor means to return said movable means to a position for re-establishing said load transmitting connection, and other springs operable upon relief of stress in the aforementioned springs to return said movable latch elements to positions facilitating re-establishment of said second connection.

10. In a semi-trailer having a bed member and detachable gooseneck member for transmitting load to a tractor, the bed member having a seat portion and the gooseneck member having a base portion which seats thereon in coupled relation of said members, the improvement which comprises, means forming a detachable load transmitting connection between said members, motor means operable to urge said connection toward disengagement with insufficient force to overcome the friction in said connection incident to trailer bed load thereon but with sufficient force to disengage said connection when said load is relieved, means forming a second connection securing said members against substantial relative movement when said load bearing connection is disengaged, means operable, when said load bearing connection is disengaged, to urge said second connection toward disconnected relation with a force inadequate to overcome frictional resistance therein incident to securing said members against relative movement but with sufficient force to disconnect said second connection when the latter said load is relieved, whereby to facilitate uncoupling said members.

References Cited in the file of this patent

UNITED STATES PATENTS

| | | |
|---|---|---|
| 1,465,168 | Morris | Aug. 14, 1923 |
| 2,489,112 | Talbert | Nov. 22, 1949 |
| 2,545,584 | Meadows | Mar. 20, 1951 |
| 2,706,059 | Parker | Apr. 12, 1955 |

FOREIGN PATENTS

| | | |
|---|---|---|
| 544,160 | Germany | Feb. 15, 1932 |